United States Patent [19]
Kurtz et al.

[11] 3,970,982
[45] July 20, 1976

[54] BEAM TYPE TRANSDUCERS EMPLOYING ACCURATE, INTEGRAL FORCE LIMITING

[75] Inventors: Anthony D. Kurtz, Englewood; Joseph R. Mallon, Alpine; Amnon Brosh, Demarest; James William Bice, Wayne, all of N.J.

[73] Assignee: Kulite Semiconductor Products, Inc., Ridgefield, N.J.

[22] Filed: July 7, 1975

[21] Appl. No.: 593,631

[52] U.S. Cl. .................................. 338/4; 73/141 A; 338/42
[51] Int. Cl.² ........................................ G01L 1/22
[58] Field of Search ................ 338/4, 5, 36, 42, 47; 73/141 A, 398 AR, 88.5 SD

[56] References Cited
UNITED STATES PATENTS

| | | | |
|---|---|---|---|
| 3,204,463 | 9/1965 | Tuber | 73/141 A X |
| 3,389,362 | 6/1968 | McLellan | 338/4 |
| 3,461,416 | 8/1969 | Kaufman | 338/4 |

Primary Examiner—C. L. Albritton
Attorney, Agent, or Firm—Arthur L. Plevy

[57] ABSTRACT

A beam transducer of the type activated by a push rod secured to a thin silicon diaphragm including a shallow deflection area determining depression. The rod is secured to the silicon within the depression and is surrounded by a plate of glass having a central rod accommodating aperture and secured to the silicon to generally cover the depression with the rod extending through the aperture in the glass. One end of the rod is coupled to a diffused beam for application of force thereto. Large forces as applied to the diaphragm and hence, the rod and the beam are limited when the silicon is caused to contact the glass plate and is stopped by the plate and according to the depth of the depression.

18 Claims, 10 Drawing Figures

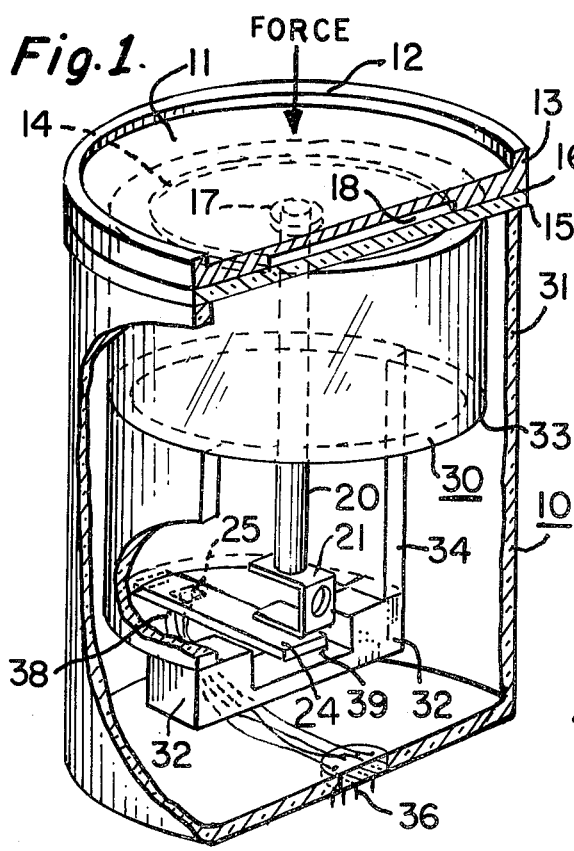
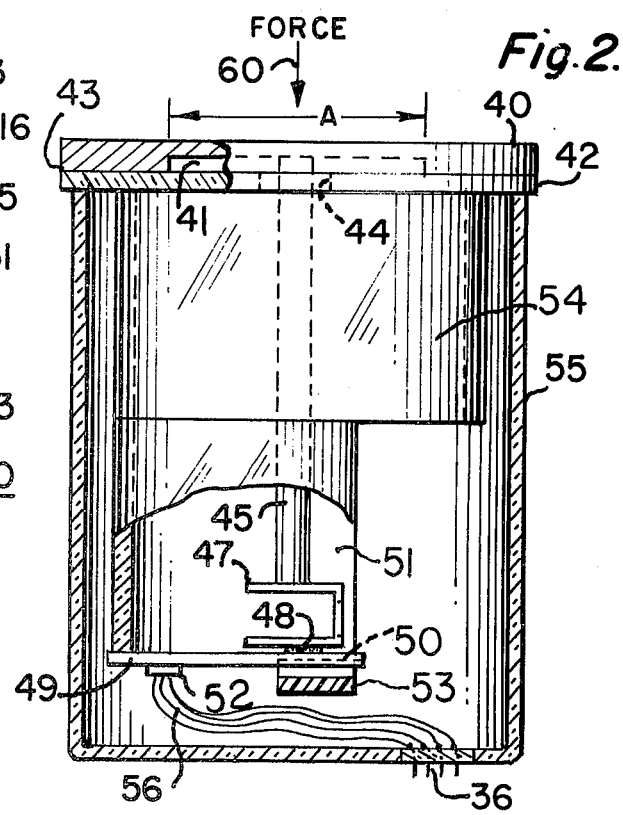
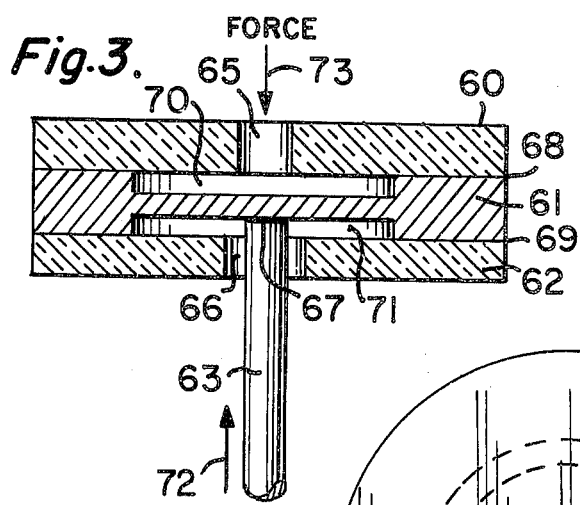
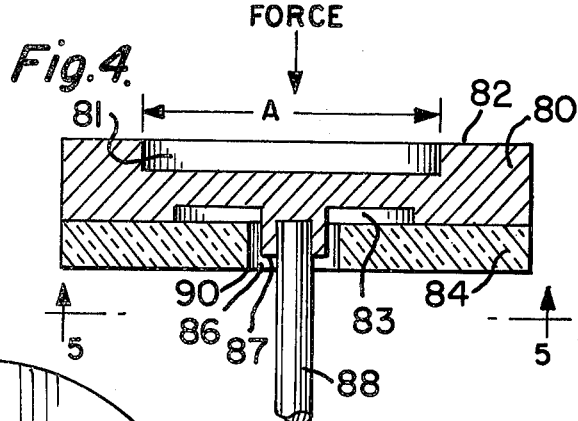
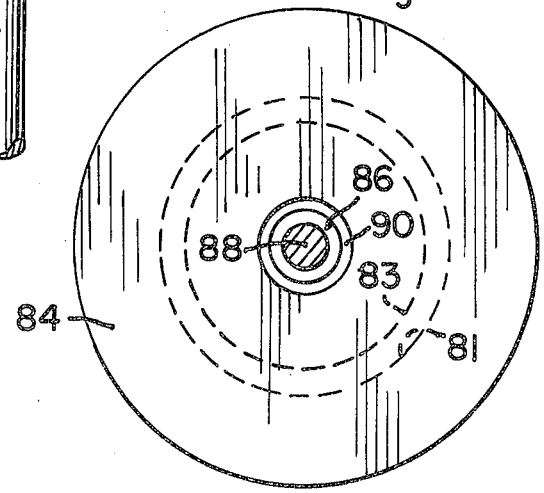

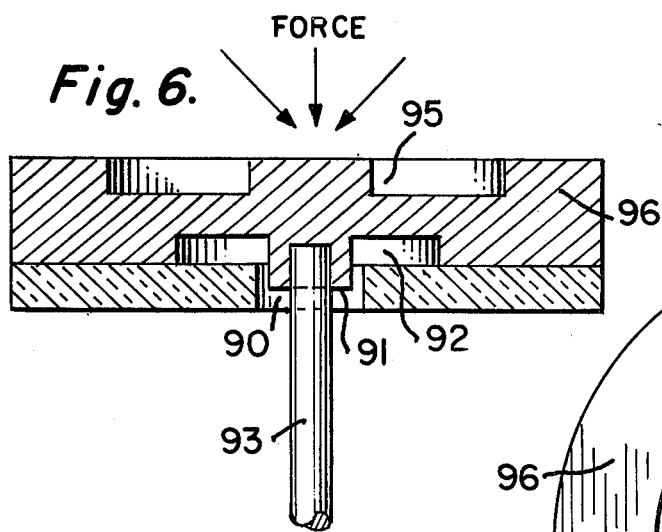
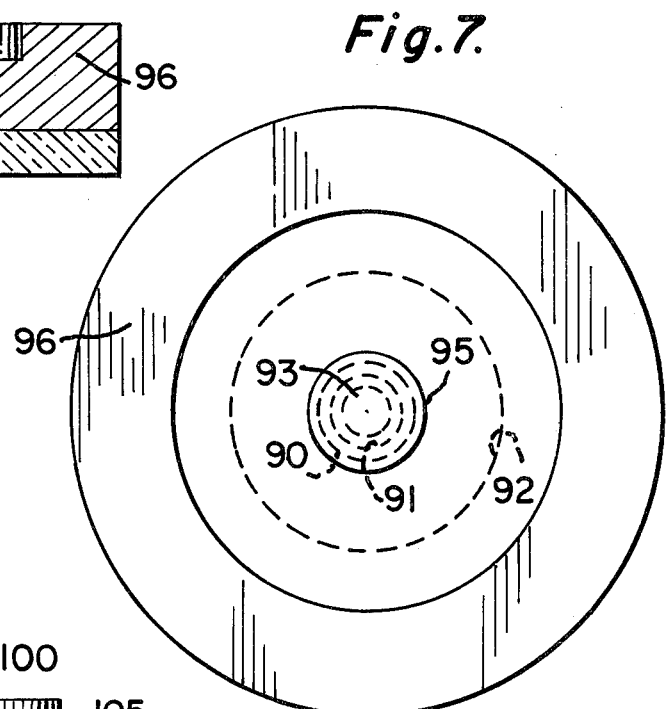
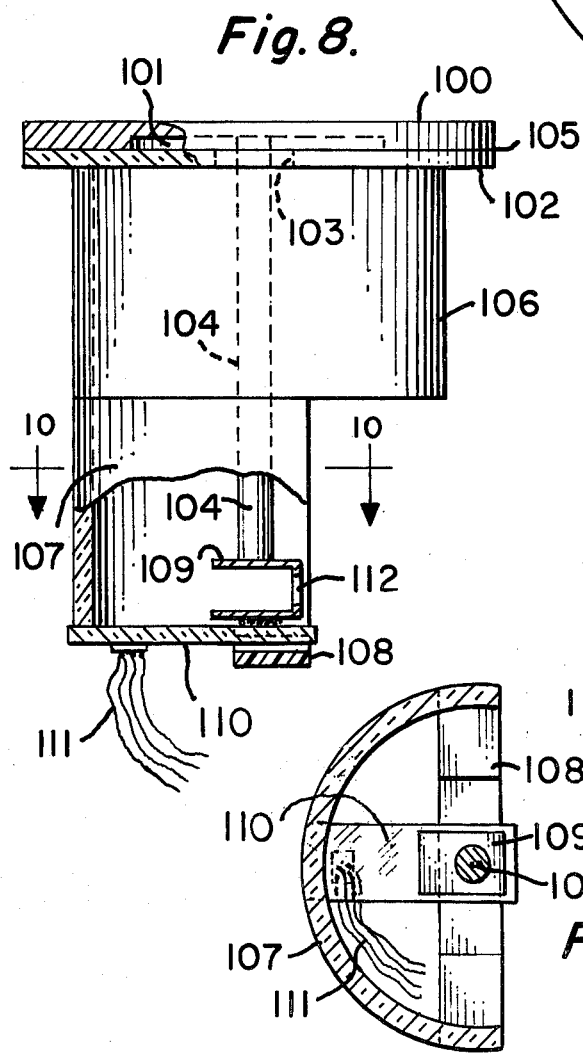
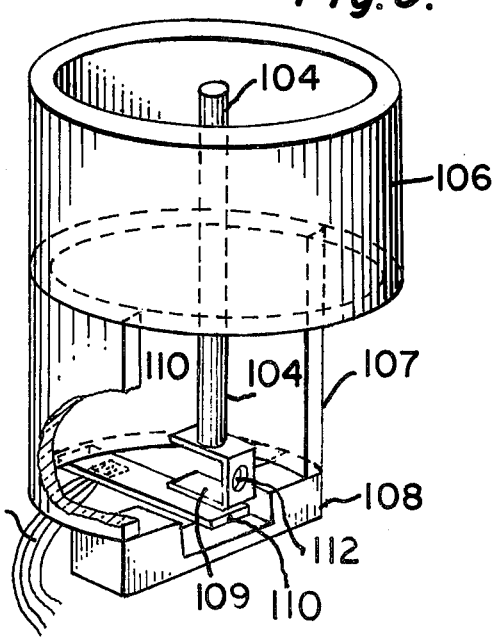

BEAM TYPE TRANSDUCERS EMPLOYING ACCURATE, INTEGRAL FORCE LIMITING

BACKGROUND OF INVENTION

This invention relates to electromechanical transducers and more particularly to such transducers employing push rods for force coupling with integral stopping mechanisms.

There exists a great variety of transducers which are used to measure force and pressure in different environments. As such, gages or load cells of many different types are normally employed in conjunction with suitable mechanical force transmitting strutures to achieve such measurements.

An extremely popular type of gage utilizes the well known piezoresistive effect, which effect is exhibited by certain semiconductor material and basically affords a change in resistance according to the magnitude of an applied force. Such devices using the piezoresistive effect are basically extremely small due to the fact that the device can be fabricated by utilizing integrated circuit techniques.

As indicated, there are many different configurations showing the use of such transducers and associated gages. Reference may be had, for example, to an article entitled DEVELOPMENT AND APPLICATION OF HIGH TEMPERATURE ULTRAMINIATURE PRESSURE TRANSDUCERS by Anthony D. Kurtz and John Kicks which was presented at the ISA Silver Jubilee Conference in Philadelphia, Pennsylvania in October, 1970.

As such, a fairly common type of transducer is sometimes referred to as a cantilever beam transducer and such devices in conjunction with gages, are used to sense and provide an output indicative of force and torque. The deflection of the beam causes the gages, which are positioned on the beam, to exhibit a change in resistance proportional to the force applied to the beam.

As is the case in most transducers, the accuracy of the cantilever or a beam transducer in general, depends upon the limit of deflection within the elastic range of the beam material. The same comments are applicable to other beam type transducers as the simply supported beam or the so-called clamped-clamped beam.

In the event, such cantilever structures can also be extremely small and respond to extremely small forces or torques while providing highly reliable and accurate measurments.

An example of one type of beam transducer is shown in U.S. Pat. No. 3,461,416 issued on Aug. 12, 1969 to E. N. Kaufman and assigned to The Lockheed Aircraft Corporation.

Essentially, the transducer operates in conjunction with a diaphragm upon which a force is applied. The diaphragm is normally coupled to the beam by means of a rod or a cylinder, which acts as a force transmitter.

As indicated, such devices are extremely small and one must assure that the deflection of the beam due to the application of the applied force, is held within the elastic limits of the beam material. One must also assure that an excessive force will not destroy the structure by causing a fracture or an actual breakage of the beam. Techniques for controlling the amount of deflection of the beam are known in the art and are generally referred to as stops. Inherently, most stops provided by the prior art are in the nature of mechanical devices such as pins, bosses and so on and essentially, are operative to prevent the exceeding of the elastic limits of the beam, which essentially can cause a complete destruction of the transducer or a permanent deformation of the beam resulting in unreliable operation of the transducer. However, such stops are not suitable for use with deflections of the order of 0.001 or less; and hence are referred to as gross stops.

The problems depicted are difficult to solve due to the extremely small size of the components as well as the extremely small deflection ranges of the units.

In particular, a cantilever structure presents problems which are peculiar to the configuration and hence, providing a stop mechanism in such a configuration, while maintaining good accuracy, is of considerable concern.

It is therefore an object of the present invention to provide an improved beam transducer employing built-in stops which are capable of assuring that the elastic limits of the materials are not exceeded, while further assuring that the beam will not rupture or fracture when external high forces are applied thereto: with regard to the small deflections used herein.

BRIEF DESCRIPTION OF PREFERRED EMBODIMENT

In a beam type transducer of the type employing a deflectable beam having positioned on a surface thereof, at least one force responsive element, in combination therewith means for transmitting a force to said beam employing means for accurately stopping said beam for all forces in excess of a predetermined force, comprising a silicon member having a central shallow depression on a surface thereof, said depression being of a predetermined depth selected according to said predetermined force, a glass cover member, having a central aperture of a given dimension coupled to said silicon member to cover said depression and a rod havng one end coupled to said diaphragm within said depression and extending through said central aperture in said glass with said other end coupled to said beam for deflecting the same upon application of a force to said silicon member, such that all forces in excess of said predetermined force cause said silicon to impinge upon said glass and thus stopping said silicon and said rod coupled thereto according to the depth of said depression.

BRIEF DESCRIPTION OF FIGURES

FIG. 1 is a cross sectional perspective view of a beam transducer assembly according to the invention.

FIG. 2 is a side cross sectional view of a transducer as in FIG. 1.

FIG. 3 is a cross sectional view of a double stopped rod and diaphragm transducing assembly.

FIG. 4 is a cross sectional view of an alternate mechanical assembly for a rod and diaphragm according to the invention.

FIG. 5 is a bottom view of the apparatus of FIG. 4.

FIG. 6 is a cross sectional view of another mechanical rod activating assembly with a built-in stop.

FIG. 7 is a top view of the apparatus of FIG. 6.

FIG. 8 is a side view of a cantilever transducer according to the invention.

FIG. 9 is a perspective view depicting a push rod and the cylindrical housing configuration.

FIG. 10 is a top view of the structure shown in FIG. 9.

DETAILED DESCRIPTION OF FIGURES

Referring to FIG. 1, there is shown a cross sectional view of a cantilever or push rod activated transducer 10.

The unit described has a top diaphragm member 11 fabricated from silicon. The member 11 may have a peripheral flange 12 to offer additional support, which flange may be integrally formed by an etching process during the formation of the diaphragm member 11, or may be an additional glass or silicon ring, which may be bonded to the member 11 by means of a diffusion bond 13 employing a glass which is compatible with silicon. Examples of such glass are many and are known in the art.

In any event, the diaphragm member 11 is a relatively thin piece of silicon and has etched on a bottom surface thereof, a shallow depression 14. The depression 14 is formed by a chemical etching process and the depth of the depression is accurately controlled and may be extremely small.

Essentially, orders of magnitude between one-tenth of a mil to several mils can be accommodated by the chemical etching process to form the depression as 14.

A relatively thick piece of glass 15 is then bonded to the underside of the silicon diaphragm 11, again by forming a diffusion bond 16 therebetween. The diffusion bond, basically, is formed between the glass and the silicon. The glass member 15 and the silicon diaphragm 11 are held in intimate contact by exerting a pressure between the parts. The temperature is then raised and a relatively high voltage is applied to the silicon and the glass, causing a current to flow to form a good uniform bond as 16.

A particular, unexpected advantage of using the diffusion bond is the very small region of inter-penetration, on the order of hundreds of Angstroms. This insures that the relative dimension of the diaphragm travel to the stop is preserved.

The glass has a central aperture 17 located therein, which aperture communicates with the under surface of the diaphragm 11 and forms a shallow internal recess 18 including the depression 14 in the silicon and a top surface of the glass about the periphery of the aperture 17.

A push rod 20 is glued by means of an epoxy bond or another suitable material in a relatively central position within the aperture 14 and is thus secured to the bottom of the diaphragm 11.

The push rod 20 may be typically fabricated from an insulative material such as ceramic, sapphire or glass. Alternatively, one may also secure the push rod 20 to the silicon diaphragm by means of a solder glass bond or by means of a diffusion bond where the glass selected has a thermal expansion coefficient compatible with silicon.

The other end of the rod 20 rests on a C shaped force transmitting member 21. Basically, the member 21 is fabricated from a relatively thin piece of a flexible metal and serves to transmit force between the push rod 20 and the cantilever beam or transducer 24. As is known in the art, the flexible metal acts as a flexure enabling the push rod to move normal to the diaphragm while the beam is deflected in an arc.

The other arm of the C shaped member 21 is secured to the moveable edge of the cantilever beam structure 24 by means of an epoxy or other bond.

The arm of the C shaped member 21, which is contacting the rod, can be bent or moved up or down to assure contact with the rod 20. In this manner, the C shaped member 21 also assures that the length of the rod need not be accurately determined, as the movement of the top arm of member 21 assures that any rod 20 having a dimension within fairly large tolerances will operate.

This, of course, eliminates the need for accuracy controls and machining of the relatively small rod 20.

Basically, the cantilever structure 24 is a diffused beam. Hence, the beam 24 is fabricated from a relatively thin piece of silicon. In this manner, a suitable piezoresistive configuration 25 can be diffused directly into the silicon beam 24, as shown in the Figure on the underneath surface thereof.

The silicon beam 24 possesses an excellent modulus of elasticity and a very high stiffness to density ratio. Hence, silicon is a good choice for use as flexing structure and has been used, for example, in the prior art as both a material for beams as well as diaphragms.

Shown coupled to the glass layer 15 is a generally cylindrical housing 30. Basically, housing 30 comprises a top full cylindrical section 33 and a bottom half cylindrical section 34. The sections 33 and 34 are fabricated from a relatively thick glass tube and may be a single piece of glass or formed by bonding the sections 33 and 34 together as shown.

The silicon beam 24 is secured by means of a diffusion bond or otherwise to the peripheral edge of the half cylinder section 34. Use of the half cylindrical section 34 facilitates access to a fabricator in positioning and attaching the push rod 20 to the flexure member 21.

A gross stop member 32 is also positioned and bonded to the peripheral edge of the half cylinder member 34. The member 32 is "U" shaped and may be fabricated from silicon. The arms of the U are bonded by means of an epoxy or diffusion bond to the half cylinder 34. The member 32 has a channel 39 included therein, which channel is slightly wider than the width of the beam 24 and of a depth which is precisely controlled by a chemical etching process; to enable the depth to be controlled within 0.0001 inches. The depth of channel 39 is selected to be relatively equal to the thickness of the beam 24 plus the desired maximum beam travel. The beam 24 is positioned within the channel 39, but does not contact the surfaces of the member 32. For maximum forces during attachment, the beam 24 will contact the bottom surface of channel 39 and hence, be stopped by the same.

The use of the diffusion bond to secure the stop member 32 to the half cylinder 34 further assures the preservation of close tolerances required for insuring the desired maximum deflection.

Essentially, the member 32 acts as a gross stop to prevent the beam from being pushed beyond the elastic limits of the silicon during fabrication and assembly to such a degree as to cause fracture or actual breakage of the beam 24.

The allowed travel of the beam 24, as determined by the U shaped stop 32, is chosen to be somewhat in excess of the allowed diaphragm travel; insuring that when a pressure is applied to the completed assembly, the diaphragm is restrained by its own stop.

Wires 38 are bonded to the appropriate terminals of the diffused bridge pattern 25 and directed through the outer housing 31 to the external environment for connection to appropriate instrumentation. The sensor diaphragm structure is enclosed by the outer housing 31 which may be fabricated from glass and bonded to the underside of the glass plate 15 by means of a glass or an epoxy bond. The housing 31 may be also fabricated from a ceramic or a metal depending upon the application or the environment that the transducer assembly 10 is to be used in. An external sleeve may be provided for additional protection.

The glass housing 31 provides mechanical protection and also functions to provide high voltage isolation for such uses as in medical application where one would desire a great deal of isolation between the diaphragm 11 and the terminal area 36 to prevent electrical shock hazard to a patient in such medical applications.

Referring to FIG. 2, there is shown a front cross section of the transducer in FIG. 1 to give still a clearer understanding of the structure and for ease in presenting the mode of operation.

A thin piece of silicon 40 is shown and does not include the annular ridge 12 of FIG. 1, but may be fabricated with such a ridge.

As indicated, the silicon diaphragm 40 has a shallow recess 41 formed in the bottom surface thereof by a chemical etching technique. The thickness of the silicon between the recess 41 and the top surface to which a force is applied, is relatively thin and essentially constitutes a flexible diaphragm.

The silicon diaphragm assembly 40 is bonded to a thick piece of glass 42 by means of a diffusion bond 43. The glass has a central aperture 44 for surrounding the ceramic push rod 45.

One end of the push rod 45, as above indicated, is glued or joined to the diaphragm 40 within the shallow depression 41 and at a relatively central position. As indicated above, the end of the rod 45 is thus bonded to the diaphragm 40 by means of a bond 46 as characterized above. The other end of the rod 45 is in contact with the C shaped force transmitting member 47.

The bottom arm of the C shaped member 47 is epoxied or glued to the free end of the diffused beam 49.

The beam 49, as shown, is clamped at the other end by means of a diffusion bond 50 to a cylindrical half section 51. The cylindrical half section 51 is fastened in turn to a full tubular or cylindrical member 54 which is attached to the glass member 42 via epoxy or other bond.

The stop member 53 is positioned as shown, and has the stopping surface a predetermined distance from the adjacent surface of the beam 49.

Shown positioned on the bottom of the beam 49 is a diffused piezoresistive gage pattern 52. A plurality of wires, such as 56, are directed from contacts associated with the bridge pattern 52 to the rear of the housing 55.

The transducer shown has an integral stop mechanism which is primarily determined by the height or depth H of the recess 41 preformed in the silicon member 40.

Some operating aspects of the unit are as follows:

As shown in the figure, a force is applied in the direction designated by arrow 60 and may be representative of the force of a moving fluid or a pressure point to be monitored. The force impinges upon the top surface of the diaphragm 40, which is fabricated from silicon and as indicated, is an excellent force transmitter.

The rod 45, which is rigidly secured to the underside of the diaphragm, is pushed downwardly for the downward movement of the diaphragm 40. The pushing of the rod is transmitted to the cantilever beam 49 via the force transmitting member 47.

The cantilever is therefore urged downwardly causing the bridge pattern 52 to exhibit a variation in resistance due to the deflection of the beam 49. This variation in resistance is, of course, monitored by means of the above described leads and such characteristics for such piezoresistors operating in conjunction with cantilever beam assemblies as 49 are well known.

In any event, to obtain very small and reliable force measurements, one has to assure that the deflection limitations in regard to elastic limit and so on are not exceeded.

Generally, one knows the magnitude of typical force to be applied to the diaphragm 40, but one does not know or cannot account for excessive force which may be present in the force transmitting environment or may occur due to unexpected perturbations.

Accordingly, any force which causes the diaphragm to deflect beyond the distance H will be limited by the distance H as the silicon diaphragm will impinge and contact the glass plate 42 about the periphery of the aperture 44.

It has been determined that due to the compatibility of characteristics of glass and silicon, that this impingement of one against the other will stop the diaphragm without resulting in fracture or rupture of the same.

Since the dimension H can be accurately held and can be extremely small due to the chemical etching technique, the stop mechanism thus described, prevents one from exceeding the elastic limits of the beam or the diaphragm, as well as enabling one to completely ascertain the range of force operation of the transducer over very closely controlled limits. This is so as once the silcon diaphragm impinges upon the glass, the cantilever cannot move any further and therefore, the reading at this maximum position can be used as an upper force reading, or as a limit, which limit will not be exceeded by the application of any greater force.

Generally, the stop described and techniques for fabricating the same as well as dimensional tolerances and control has been described in greater detail in a co-pending application entitled INTEGRAL TRANSDUCER ASSEMBLIES EMPLOYING BUILT-IN PRESSURE LIMITING filed on May 1, 1975 as Ser. No. 573,624 and assigned to the assignee herein.

This operation or limiting of a beam type transducer within such tolerances has not been available by prior art structures.

The stop 53, as indicated above, is a gross stop, but is necessary to prevent fracture or rupture of the cantilever beam during fabrication of the same or during the process of load placement.

As indicated, the beam 49 is extremely small and a technician may inadvertently apply too much force when placing the rod 45 or adjusting the member 47. In this manner, the stop 53 serves to limit the movement of the beam during such operations.

As can be ascertained from FIG. 2, the diaphragm of the shallow depression 41 basically determines the active area A. The active area A is that area onto the surface of which a force may be applied to cause deflection of the diaphragm and hence, while the force is shown generally in a central position with respect to area A, a force impinging on a portion of the area will cause deflection of the diaphragm.

Typically, the dimensions involved in such a transducer as the one in FIG. 2 are as follows:

The dimension A in FIG. 2 may, for example, be 200 mils.

The aperture 44 in the glass member 42 is approximately 40 mils. The thickness of the diaphragm (silicon beneath area A), is between 2 and 3 mils. The length of the beam 49 is is about 100 mils. The height of the depression 41 can be between 0.1 and 0.5 mils. The bridge pattern 52 is about 10 mils; and the dimension of the flexure member 47 is about 30 by 60 by 30 mils. The diameter of the rod 45 is about 20 mils. Thus, one can see that the assembly is extremely small and relatively fragile.

Referring to FIG. 3, there is shown a portion of a transducer including a push rod 63 which essentially, is the same type of rod as 45 of FIG. 2.

It is therefore understood that the additional components in regard to the beam and the force transmitting member are omitted for purposes of clarity, as alternate embodiments of the stop mechanism are to be described.

The configuration shown in FIG. 3 serves as a double stop. What is meant by a double stop; is that the configuration will limit the deflection of the push rod for force applied in either direction.

The mechanism utilized in FIG. 3 shows a central silicon member 61 having etched therein, both a top shallow depression 70 and a bottom shallow depression 71. Both depressions, as above indicated, may be formed by a chemical etching process, although the effective depths of both depressions do not necessarily have to be equal.

For example, one may require more force to stop the diaphragm in the direction indicated by arrow 72 than required to stop the diaphragm in the direction indicated by arrow 73. Hence, the depth of the depression 71 may be greater than 70 or vice versa.

The central member of silicon 61 thus has a chemically milled depression 70 on the top surface and one depression 71 on the bottom surface. A plate of glass 60, which is thicker than the silicon 61, is bonded to the top surface. The plate of glass 60 has a relatively central aperture 65 for introducing a force to the diaphragm portion of the silicon "H" shaped member 61. Also shown is a second plate 62 generally of the same dimensions and thickness as plate 60 and also having a central aperture 66 for surrounding and accommodating the rod 63.

The rod 63, as above indicated, is epoxied, glued or otherwise secured centrally with the active area of the diaphragm portion of the silicon member 61 on the bottom surface thereof.

As can be seen, the depth of recess 70 serves as a stop for forces applied to the diaphragm in the direction of arrow 72, while the depth of recess 71 serves as a stop for forces applied in the direction opposite to arrow 71.

Referring to FIG. 4, there is shown an alternate embodiment of a beam activating rod and stop assembly according to this invention.

The silicon member 80 is shown and has an "H" shaped configuration with a top depression 81 formed therein to provide an annular flange 82 about the periphery of the silicon member 80 for mechanical strength and to provide rigidity. A shallower depression 83 is also included and formed by a chemical etching process. The depth of the depression 83 determines the movement of the diaphragm (A) containing the same for forces which cause the silicon material to impinge upon the glass plate 84.

The depression 83 is etched of a depth as above described, but in this instance, a central annular boss 86 is also provided. The boss 86 is generally an annular structure having a rod accommodating aperture 87 therein. A collar or wall of the boss 86 surrounds the rod 88, when the rod 88 is inserted into the aperture 87. The rod 88 is glued or epoxied with the aperture 87. This provides a support collar for the rod 88. For example, in the configuration shown in FIGS. 1, 2 and 3, the rod is directly bonded to the diaphragm, without the boss or collar 86. The collar 86 facilitates centering the push rod and insures better mechanical support.

The height of the boss 86 may be greater than the depth of the depression 83 and the boss 86 may extend into the hole or aperture 90 in the glass plate 84. The glass plate 84 is secured to the silicon member 80 by means of a diffusion bond, as above described.

FIG. 5 shows a bottom view of the transducer rod assembly depicting the nature of the collar member 86 surrounding the central rod 88.

In FIG. 6, there is shown a cross sectional view of still another embodiment of a transducing element having greater mechanical stability.

The configuration shown in FIG. 6 includes an annular boss 90 having a rod accommodating aperture 91 for firmly supporting the rod 93 by means of a bond formed about the enclosed surface of the rod 93 and the collar of the boss 90.

The diaphragm has included on a top surface thereof, a circular boss 95 to stiffen the central portion of the diaphragm which is unsupported after the stop has been engaged. This prevents damage to the central portion of the diaphragm from concentrated loads with an area contact less than as the order of the aperture 90.

The silicon member 96 is also "H" shaped and has a shallow depression 92 etched about the annular boss 90 by a chemical etch accomplished as is known, with nitric-hydrofluoric acid mixtures and masking techniques. See the above noted application for such techniques.

FIG. 7 shows a top view of the configuration of FIG. 6 showing the circular boss 95 and its relation and position with respect to the centrally located rod 93.

FIG. 8 shows a side view of the transducer assembly also indicating the nature of the surrounding cylindrical housings.

A top silicon layer 100 which may, as indicated, be circular, rectangular or otherwise shaped, has a depression 101 formed therein by a chemical etching process. A layer of glass 102 having an aperture 103 for accommodating an insulator push rod 104, is bonded to the silicon by a diffusion bond 105.

The push rod 104 is epoxied or otherwise joined within the depression 101 to the silicon piece 100.

A cylindrical glass housing 106 is bonded to the glass layer 102 and surrounds the upper portion of the rod 104. A bottom half cylindrical member 107 is coupled to the top member 106 by means of a diffusion bond or epoxy.

A diffused beam or cantilever 110 is bonded to the periphery of the half cylinder 107, by a diffusion bond or otherwise and hence, is rigidly supported and clamped at this end. The beam 110 extends into the aperture of the "U" shaped stop member 108, wherein the arms of the "U" are bonded to the half cylinder 107.

The flexure member 109 couples the rod 104 to the free end of the beam 110. Flexure member 109 assures that the motion imparted to the beam 110 is linear as above described.

As one can ascertain from the FIG. 7, the unit is integral as fabricated.

Leads 111 can be connected or joined to the bridge pattern 112 to enable the external connection of instrumentation for monitoring the response of the transducer.

FIG. 9 shows a perspective view giving a clear indication of the nature of the housings as 106 and 107, the flexure member 109 has an aperture 112 in the central arm to provide force concentration.

FIG. 10 is a top view of FIG. 9 to further give one a clearer insight to the arrangement of the components.

In summation, an improved beam transducer is provided having a shallow depression etched in a a silicon force transmitting diaphragm, which depression determines the maximum deflection of the diaphragm as the silicon within the depression impinges and is stopped by a layer or plate of glass secured to the silicon about the periphery of the depression. This also, therefore, determines the maximum travel of a rod coupled to the diaphragm. A silicon beam is also coupled to the rod and is provided with its own gross stop in the form of a "U" shaped member coupled across a half cylindrical member.

We claim:

1. In a beam type transducer of the type employing a deflectable beam having positioned on a surface thereof, at least one force responsive element, in combination therewith means for transmitting a force to said beam employing means for accurately stopping said beam for all forces in excess of a predetermined force, comprising:
    a. a silicon member having a central shallow depression on a surface thereof, said depression being of a predetermined depth selected according to said predetermined force,
    b. a glass cover member having a central aperture of a given dimension coupled to said silicon member to cover said depression,
    c. a rod having one end coupled to said silicon member within said depression and extending through said central aperture in said glass with said other end coupled to said beam for deflecting the same upon application of a force to said silcon member, such that all forces in excess of said predetermined force cause said silicon member to impinge upon said glass and thus stopping said silicon member and said rod coupled thereto according to the depth of said depression.

2. The transducer according to claim 1 wherein said silicon member has an "H" shaped cross section with a first depression of a given depth on a top surface and said shallow depression colinear with said first depression and located on a bottom surface, the area between said top and bottom depression forming a deflectable diaphragm defined by the center arm of said "H" shaped cross section.

3. The transducer according to claim 1 wherein said depression is between 1/10 and several mils and is formed by a chemical etching process.

4. The transducer according to claim 1 wherein said rod is fabricated from an insulator and is bonded to said silicon member relatively centrally within said shallow depression.

5. The transducer according to claim 1 further including a rod accommodating annular boss coupled to said silicon member and positioned relatively centrally thereto in alignment with said central aperture of said glass cover member, said boss having an aperture for accommodating said rod.

6. The transducer according to claim 2 further including a central boss located within said bottom shallow depression on said bottom surface, said boss having an aperture for accommodating said rod.

7. The transducer according to claim 1 wherein said beam is fabricated from a semiconductor and has at least one piezoresistor diffused on a surface thereof.

8. Apparatus for activating a beam type transducer of the type comprising a relatively thin, clamped beam having located on a surface thereof, a force responsive element, said beam having an area for application of a force thereto to cause a proportional variation in a characteristic of said element, comprising:
    a. a semiconductor member having a shallow depression on a first surface thereof, said depression having a depth determined by the magnitude of a given force to be applied to said beam,
    b. a rod coupled to said member and positioned within said depression and extending from said semiconductor member in a direction relatively perpendicular to said first surface,
    c. a glass sheet having an aperture, said glass sheet coupled to said semiconductor member at said first surface with said rod extending therethrough and serving as a barrier to prevent said semiconductor member from deflecting beyond said glass position of said glass for forces applied to said semiconductor having a component to cause said rod to move relatively parallel to its axis, and
    d. means coupling the other end of said rod to said area of said beam.

9. The apparatus according to claim 8 wherein said semiconductor member further includes a second shallow depression on the opposite surface and relatively coaxial with said shallow depression on said first surface, and a second glass plate having a central aperture coupled to said opposite surface of said semiconductor to cover said second depression to cause a force applied to said first surface of a predetermined magnitude to cause said silicon member to impinge upon said second glass layer.

10. In combination:
    a. a cylindrical housing having a central hollow, being symmetrical about a longitudinal axis,
    b. a cantilever beam havng a first end affixed to a portion of said housing and a second deflectable end positioned relatively transverse to said axis,
    c. a force transmitting member coupled to said deflectable end of said beam,
    d. a rod having a first end coupled to said force transmitting member for activating the same in response to an applied force and positioned relatively parallel to said axis,
    e. a glass plate having a central rod accommodating aperture and secured to said housing at a first end with said rod postioned through said aperture,
    f. a silicon member bonded to said glass plate and having a shallow depression larger than said aperture in said glass and of a depth selected according to a predetermined force to be applied to said rod, said other end of said rod coupled to said silicon member within said depression, whereby a force applied to said member is transmitted to said rod and hence, to said beam, with said depression capable of coacting with said glass plate to limit said deflection due to said force according to the depth of said depression.

11. The combination according to claim 10 wherein said cylindrical housing is fabricated from glass.

12. The combination according to claim 10 wherein said force transmitting member comprises a "C" shaped flexible member having one arm of said C rigidly secured to said deflectable end of said beam and said other arm coacting with said first end of said rod.

13. The combination according to claim 10 wherein said cantilever beam is a diffused beam having located on a surface thereof, at least one piezoresistive element.

14. The combination according to claim 10 wherein said silicon member further includes an annular ridge on a surface opposite to that surface containing said shallow depression.

15. The combination according to claim 10 further including a central annular boss located within said shallow depression on said silicon member and dimensioned to accommodate and surround said other end of said rod.

16. The combination according to claim 11 wherein said cylindrical housing includes a first cylindrical portion, said first portion coupled to said glass plate to surround said rod.

17. The combination according to claim 16 further including a "U" shaped stop member having first and second arms coupled to opposite ends of said first cylindrical portion of said housing, with the central arm of said U positioned beneath said beam to further limit deflection of said beam due to larger forces than that of those limiting said deflection.

18. The combination according to claim 10 further comprising an annular boss located on a surface opposite to that surface containing said shallow depression, said boss located relatively central on said surface and of a diameter greater than said central rod accomodating aperture.

* * * * *